United States Patent [19]

Tan et al.

[11] Patent Number: 4,525,837
[45] Date of Patent: Jun. 25, 1985

[54] DIGITAL SIGNAL TRANSMISSION SYSTEM

[75] Inventors: Yoichi Tan; Fumio Miyao, both of Ebina, Japan

[73] Assignee: Fuji Xerox Co., Ltd., Tokyo, Japan

[21] Appl. No.: 506,720

[22] Filed: Jun. 22, 1983

[30] Foreign Application Priority Data

Jul. 7, 1982 [JP] Japan ............................ 57-116812
Jul. 7, 1982 [JP] Japan ............................ 57-116813

[51] Int. Cl.³ .............................................. H04J 3/02
[52] U.S. Cl. ...................................... 370/85; 370/60;
370/89; 370/94; 340/825.5
[58] Field of Search .................. 370/85, 94, 110.1, 89, 370/60; 340/825.5

[56] References Cited

U.S. PATENT DOCUMENTS

| | | |
|---|---|---|
| 4,063,220 | 12/1977 | Metcalfe et al. . |
| 4,154,983 | 4/1979 | Pedersen ............................ 370/89 |
| 4,251,880 | 2/1981 | Baugh et al. ........................ 370/94 |
| 4,282,512 | 8/1981 | Boggs et al. ..................... 340/825.5 |
| 4,332,027 | 5/1982 | Malcolm et al. ..................... 370/85 |
| 4,380,088 | 4/1983 | Lipcon ............................... 370/85 |
| 4,386,426 | 5/1983 | Pugh ................................. 370/85 |
| 4,387,425 | 6/1983 | El-Gohacy ........................... 370/85 |
| 4,412,326 | 10/1983 | Limb ............................. 340/825.5 |
| 4,434,421 | 2/1984 | Baker et al. ......................... 370/85 |
| 4,435,804 | 3/1984 | Tan ................................. 370/94 |
| 4,439,856 | 3/1984 | Ulug ................................ 370/85 |

FOREIGN PATENT DOCUMENTS 17289581 10/1981 Japan .
15495682 9/1982 Japan .
WO83/00788 8/1982 PCT Int'l Appl. .

Primary Examiner—Douglas W. Olms
Assistant Examiner—Curtis Kuntz
Attorney, Agent, or Firm—Kinney & Lange

[57] ABSTRACT

In a digital signal transmission system for effecting time-division multiplexing/circuit switching transmission of data in the form of packets by means of telecommunication cable, a packet configuration and line connection control data inserted in the packets are improved. In phases of the establishment/termination of a call, line connection control data of the overhead field are inserted as repeated at least one time into the data field. At least one set of line connection control data of the overhead field contains a parity bit. A receiving station reads the line connection control data in the overhead field and the data field of a received packet, and determines the overhead data by the principle of decision by majority. After completion of establishment of a call, the receiving station takes in the transferred data out of a block on the basis of a positional information, for example, a number of the block. In the phase of transmission of data, transmitting station inserts additional data bits into at least part of the overhead field in the packet being transmitted.

9 Claims, 7 Drawing Figures

DIGITAL SIGNAL TRANSMISSION SYSTEM

BACKGROUND OF THE INVENTION

1. Field of the Invention

This invention relates to a digital signal transmission system for effecting time-division multiplexing/circuit switching transmission of data in the form of packets by means of a telecommunication cable. More particularly, this invention relates to a digital signal transmission system which is improved in terms of connection control characters to be contained in the overhead fields of packets. The present invention especially relates to a digital signal transmission system which is improved in terms of configuration of packets in the data transmission phase.

2. Description of the Prior Art

The dissemination of electronic computers and the growth of digital signal processing techniques have recently culminated in successful combination of telecommunication systems with data processing systems and perfection of data communications devoted to on-line data processing. These achievements are attracting mounting public interest and respect.

Particularly in the small-scale communication systems such as for the intraorganizational communication confined within the premises of a government or public office or of a private corporation, the system which effects communication in the form of packets by means of a telecommunication cable such as a coaxial cable is arresting particularly keen interest owing to its features such as good economy, high reliability, and prominent efficiency of transmission.

This communication system which makes use of packets requires installation, as in laboratories, of communication cables adapted to effect transmission in both directions and connection to these communication cables of numerous personal stations. From these personal stations, messages divided into data blocks each of 1000 to 2000 bits, for example, are transmitted through the telecommunication cables. The individual messages are each prefixed with a header covering such information as address and serial number.

In the communication system of this nature, the network itself is a passive transmission medium totally devoid of any control function and the individual personal stations have such control functions thoroughly distributed among themselves.

At a given personal station, therefore, transmission of a messabe is started when an idle channel is available in the cables. When a packet of message transmitted from one personal station collides with a packet of message transmitted from another personal station, these two personal stations discontinue the transmission of their messages. The personal station which has discontinued the transmission, on elapse of a random queuing time, tries to resume the transmission of the message.

In the communication system of this operating principle, users posted near the personal stations enjoy access to a common computer to which the communication system is interfaced. They are also able to have common use, through the medium of this communication system, of various items of hardware such as memory devices and various items of software such as programs distributed throughout the organization.

The devices such as high-speed or high-precision printers and large-capacity files which are concentrated at the large-scale central processing unit in the time-sharing system can be used in th communication system as widely distributed within the premises of a given organization.

The communication system, therefore, enables the user to enjoy economization of resources and improvement in efficiency of utility. Besides, it warrants ample flexibility of programs and data and promises development of an intensive software system.

Further, the communication system of this nature has an advantage that all the personal stations are equally entitled to the use of channels, namely no special personal station has priority on the use of a channel over the remainders. This means that the present communication system does not have the hierarchical relationship often found among the personal stations in communication systems of other operating principles, so that communication can be established between two freely connected personal stations.

It has another advantage that the system can be easily designed in a highly reliable network because the component channels such as of coaxial cables are invariably formed of completely passive circuits.

One version of the digital signal transmission system of the operating principle described above contemplates causing frames which are periodically repeated on the time base to be each divided into a plurality blocks similarly on the time base and enabling the individual personal stations to find chances to effect packet communication by the unit of such blocks (as proposed by Japanese Patent Application No. SHO 56(1981)-38714, for example).

In this signal transmission system, all the personal stations are equally entitled to the use of idle blocks. In case where a given personal station occupies a specific block over a duration necessary for signal transmission, that personal station is periodically given a chance for signal transmission in each of frames repeated on the time base. Thus, this system permits the personal stations to effect real-time transmission of signals by making use of the function described above.

Figures 1, 2:
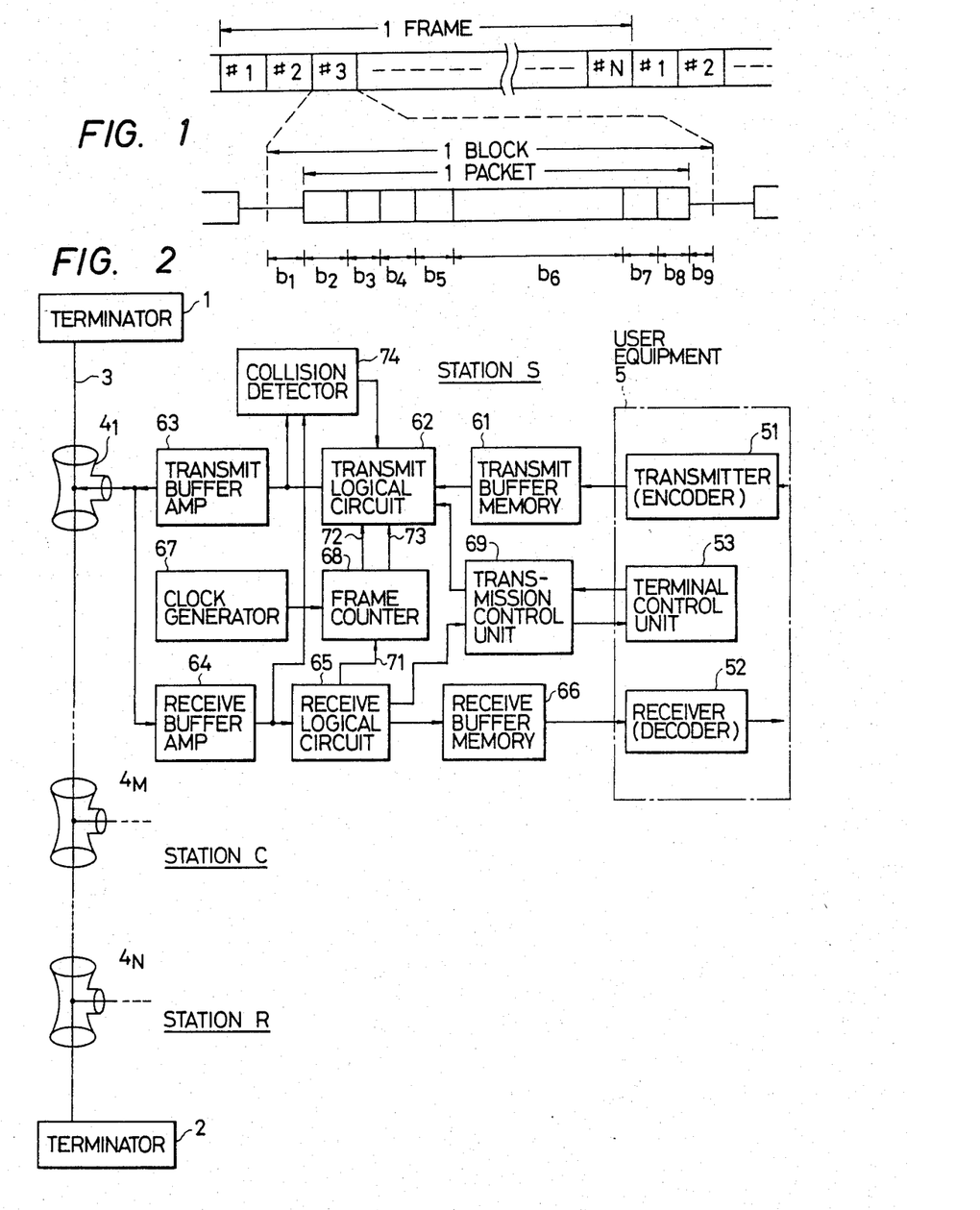
FIG. 1 is a diagram illustrating typical conventional frame and packet configurations for use in the digital signal transmission system.
FIG. 2 is an outlined block diagram illustrating a typical communication system suitable for the transmission of digital signals having the frame configuration of FIG. 1.

One typical frame configuration for the signals to be used in the aforementioned digital signal transmission system is illustrated in FIG. 1.

Each of the frames which are repeated periodically on the time base consists of N blocks (#1 through #N). And each of the blocks consists of various bit rows, $b_1$ through $b_9$, as shown below.

$b_1$ ... Backward guard time
$b_2$ ... Preamble
$b_3$ ... Start flag
$b_4$ ... Address bit
$b_5$ ... Control bit
$b_6$ ... Data bit
$b_7$ ... Check bit
$b_8$ ... End flag
$b_9$ ... Forward guard time The bit rows $b_2$ through $b_5$ and the bit rows $b_7$ and $b_8$ are essential components for a packet. These bit rows are collectively referred to as "overhead bits." The two bit rows, $b_1$ and $b_9$, are collectively referred to as the "guard time."

The term "guard time" means "empty bit rows" which are intended to preclude the situation in which packets in adjacent blocks may possibly be caused to overlap, if partially, owing to the delay time which occurs during the propagation of signals on a coaxial cable.

In the bit rows forming this guard time, the backward guard time $b_1$ serves to protect the trailing one of any two adjacent packets against the trouble of overlapping and the forward guard time $b_9$ similarly to protect the leading packet against the trouble.

FIG. 2 illustrates in outline a typical communication system which suits the transmission of digital signals of the frame configuration described above.

In this communication system, a coaxial cable 3 laid as a channel has its opposite ends connected to impedance-matching terminators 1, 2 having electrical resistance equal in magnitude to characteristic impedance of the said cable.

The personal stations are connected through the respective T connectors (taps), $4_1$–$4_N$, to the coaxial cable 3. All these personal stations have a basically identical structure. To avoid wasteful repetition, therefore, the essential components of the personal station, S, connected through the T connector $4_1$ are illustrated representatively in the diagram.

Each of the personal stations is provided with a user equipment 5 incorporating a computer and a telephone.

The user equipment 5 is further provided with a transmitter (encoder) 51 for transmitting digital signals of the unit of packets to some other personal station, a receiver (decoder) 52 for receiving digital signals of the unit of packets transmitted by some other personal station, and a terminal control unit 53 for controlling terminals.

The signals issued from the transmitter 51 are temporarily stored in a transmission buffer memory 61. The stored outgoing signals are then read out of the buffer memory 61 at a prescribed time by clock signals equalling the transmission speed on the coaxial cable 3 serving as a transmission medium. The signals thus read out are converted into packets of a prescribed pattern by a transmit logical circuit 62. These packets are sent through a transmit buffer amplifier 63 and forwarded via the T connector $4_1$ onto the coaxial cable 3.

All the packet signals which are being transmitted on the coaxial cable 3 are sent through the T connector $4_1$, received by a receive buffer amplifier 64, and supplied to a receive logical circuit 65.

The receive logical circuit 65 selects, out of all the incoming packets, only the packets addressed to its own personal station and puts the selected packets to temporary storage in a receive buffer memory 66. The packet signals thus kept in storage are read out continuously by the use of a prescribed clock in the receiver 52. Thus are obtained received output signals.

The transmission and reception of signals are accomplished as described above. The transmission clock which is used in this case is generated by a clock generator 67. A frame counter 68 serves to divide this transmission clock to produce a block timing signal 72 and a frame timing signal 73.

A transmission control unit 69 effects control of the terminal control unit 53 in accordance with reception signals addressed to its own personal station and derived from the receive logical circuit 65 and, at the same time, controls the transmit logical circuit 62 in accordance with instructions from the terminal control unit 53.

A collision detector 74 serves, at the time that the first packet signal is issued on the block selected by its own personal station, to check and confirm whether or not that packet signal has collided with a packet signal issued from some other personal station.

In the present digital signal transmission system, no transmission of any signal occurs on the coaxial cable 3 while none of the personal stations is engaging in the transmission or reception of signals. So far as this state lasts, signals being the reference of the frames and signals indicative of the positions of division of the individual blocks are not transmitted on the coaxial cable 3.

In this system, therefore, the initiative in both frame synchronization and block synchronization is awarded to the particular personal station that is the first to effect transmission of signals. While the first personal station is transmitting signals with block length and frame cycle agree upon with the other personal station, some other personal station urged to use the communication system is required to establish proper block and frame timings on the bases of the packets issued from the first personal station, select empty blocks of its own accord, and occupy these blocks for the transmission of signals exclusively for a required duration.

As soon as the first personal station completes its communication while some other personal station is still transmitting its own signals, such other personal station automatically assumes the initiative in frame synchronization, and the like.

Generally, the circuit switching operation involved in the digital signal transmission system of the operating principle described above may be divided into the following three phases.

A. Establishment of call
B. Transmission of data (communication)
C. Termination of call Now, these phases the circuite switching operation will be described below with respect to the aforementioned digital signal transmission system.

A. Establishment of call

It is assumed that a user of a certain personal station or a certain terminal equipment (hereinafter referred to simply as a "station") is urged to carry out communication with some other station, it accomplishes the designation of that other station by picking up a transceiver from a telephone set and by dialing the number assigned to the called station. The calling station sets the address number of the called station in the call packet of a prescribed size (the address bit, $b_4$, in the aforementioned typical frame configuration) and transmits it onto the cable 3 occupying an idle block.

If some other station happens to designate the same idle block and send out a packet in this block, there ensues collision between the two packets. In this case, the two stations temporarily discontinue transmission and separately set random queuing times and, on elapse of such queuing times, try to resume transmission of the packets. It is now assumed that the aforementioned station succeeds in sending out a call packet into an idle block without involving any collision of packets. This call packet is received by all the other stations which are connected to the cable 3. All these stations check the address data in the received packet, and only the called station to which the call is addressed takes in the call packet. This entry of the packet in the called station establishes a calling channel between the two stations.

Once the calling channel is established, the called station prepares a called packet of a prescribed size incorporating therein the address data of the calling station and sends out the signal.

If, in this case, two or more packets attempt to compete against one another for one idle block on the cable 3, there inevitably ensues collision between the packets. On detection of this collision, the operation which consists of discontinuation of transmission, waiting, and retransmission of packets is repeated until successful transmission is resulted.

When the called station succeeds in sending out the called packet and the calling station takes in this called packet, there is established a called channel.

B. Transmission of data (communication)

In the present communication system, when the transmission of a packet onto the telecommunication cable is effected, all the other stations in the system receive this packet as described above. By this reception, these other stations are enabled to sense the current status of each of the blocks in one frame and refrain from sending out packets into the blocks currently used by other stations.

When channels for both directions are established between the calling and the called stations by the procedure described above, this channel is no longer susceptible of collision of packets and enables digital data to be transferred at a fixed speed on the real-time basis.

C. Termination of call

When required communication is completed, the calling station notifies the called station of this fact by use of a packet. On receipt of this packet, the called station discontinues transmission. As the result, the called channel is relieved of service.

The calling station, after confirming that the called station has discontinued transmission, discontinues transmission of call packet. Consequently, the calling channel is similarly relieved of service. Thus, the series of operations for the release of a call is terminated.

As is evident from the foregoing explanation, each of the packets which are used in the digital signal transmission system consists of the so-called overhead bits and data bits. In the phases of establishment of a call and the termination of a call, the overhead bits play the main part. In the phase of the transmission of data (communication), the data bits play the main part instead.

In the conventional system, however, transmission packets of the same configuration are used in all the phases of the circuit switching operation. Thus, the conventional system has the disadvantage that it is not thoroughly optimized from the standpoint of efficiency of transmission. For example, in the phases of the establishment of a call and the termination of a call, data bits are not used at all and the fields corresponding to these phases are filled with meaningless, wasteful pulses. On the other hand, in the phase of the transmission of data (communication), the data of overhead bits are utilized very rarely because the specific block number is available for designation of the block.

If a bit error occurs during the packet transmission in the phases of the call establishment and the call termination, it can constitute itself a cause for erroneous connection/erroneous operation. It has been customary to confer some error detection function or other upon the system. Addition of a parity check or error detection signal is one example.

To ensure perfect transfer of overhead data, there is adopted the practice that, on detectional of an error, the system causes one and the same packet to be sent out repeatedly in the subsequent frames until data free from the error are received. This practice inevitably elongates the time required for the phases of establishment of a call and the termination of the call and, consequently, degrades the efficiency of transfer of the system as a whole.

Further in the conventional transmission system, when a transmission error occurs in the overhead bits received during the phase of the transfer of data (communication) following the completion of establishment of a call and the address bits are accordingly affected, for example, the manner in which the data in that particular error-containing packet is treated at the receiving station is not definitely established.

When a transmission error occurs in the address bits as described above during the transfer of ordinary data, one possible procedure may be for the system to ignore (discard) the data in the particular error-containing packet and to make the calling station resume the transfer of the aforementioned data. This resumption of the transfer of ordinary data, however, proves to be difficult when the data involve a fairly large volume of indiscrete data such as of voices. Particularly where the data are in the form of voices, this procedure has the disadvantage that omission of just one block from the continuous flow of data blocks can spoil the natural continuance of data and, in the extreme case, render the data imperceptible.

In the phase of the transfer of data which follows the completion of establishment of a call, the data in the overhead bits are rendered useless when the system permits a called station to take in the incoming data as those addressed to itself by using a known block number as a cue. This means that the field has admitted wasteful pulses.

SUMMARY OF THE INVENTION

This invention has been perfected by studies conducted for the solution of the various disadvantages suffered by the conventional digital signal transmission system. A primary object of this invention is to provide a digital signal transmission system which permits no omission of data even when overhead data involving a code error are received after completion of the establishment of a call.

Another object of this invention is to provide a digital signal transmission system which permits the volume of data transferred per packet to be increased by insertion of additional data bits in at least part of the overhead field.

A further object of the present invention is to provide a digital signal transmission system which is provided with connection control means capable of minimizing the aforementioned wasteful insertion of pulses in the data being transferred and maximizing the efficiency of transfer on the telecommunication cable.

To accomplish the objects described above, the present invention adopts the following measures.

(1) In the phase of the establishment of a call, the called station goes over the periodically repeated frame and seeks out the particular block containing the packet addressed to itself by reference to the block number assigned to the block, for example.

(2) In the phase of the transmission of data (communication) after completion of the establishment of a call, the station takes in the selected packet on the basis of the positional data of the packet (block number).

(3) Owing to the adoption of the measures indicated in (1) and (2) above, the capacity for data transfer per packet is increased and the efficiency of transfer is improved by decreasing to the irreducible minimum of requirement the overhead field to be used for the so-called connection control in the packet transmitted during the phase of the transmission of data and inserting additional data bits in the room consequently vacated in the overhead field.

To accomplish the other objects described above, the present invention contemplates designing the digital signal transmission system in a construction such that, with respect to the packet which is sent out during the so-called connection control as in the phases of the establishment/termination of a call, overhead bits will be repeatedly inserted in the field of data bits (data field) and the contents of the overhead bits will be reliably transferred to the receiving station even when a bit error occurs during the course of the signal transmission.

DETAILED DESCRIPTION OF THE INVENTION

Figure 3:
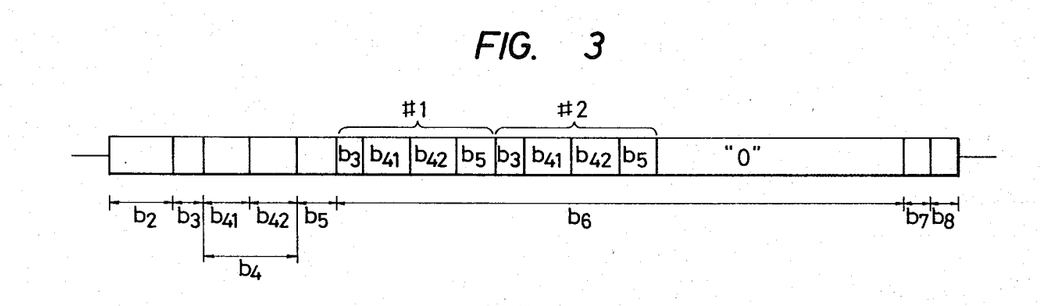
FIG. 3 is a diagram illustrating a packet configuration in the first preferred embodiment of this invention.

FIG. 3 is a diagram illustrating a typical packet configuration for use in the first preferred embodiment of this invention. In this diagram, the same symbols as used in FIG. 1 denote the same items; $b_{41}$ denotes the address of the receiving station and $b_{42}$ the address of the transmitting station and they correspond to the address bit $b_4$, of FIG. 1.

Comparison of the packet configuration of FIG. 3 with that of FIG. 1 clearly reveals that, in what corresponds to the data field $b_6$ (data bits) of the conventional packet configuration (FIG. 1), the packet configuration of the present embodiment causes part of the overhead including a start flag $b_3$, a destination address $b_{41}$, a source address $b_{42}$, a control bit $b_5$, etc. to be inserted as repeated twice, with 0's inserted in all the remaining bits of the data field.

The receiving station receives the regular overhead $b_2$, $b_3$, $b_{41}$, and $b_5$, and then commits them to temporary storage. Subsequently, it detects and stores the destination address $b_{41}$, the source address $b_{42}$, and the control bit $b_5$, in the data field, with the start flag $b_3$ as a cue.

On the basis of the logic of decision by majority, namely by the principle that in the case of three sets of data bits, for example, when at least two of them coincide, such a set of coinciding data bits is accepted as correct, the establishment/termination of a call is executed. Owing to the adoption of this packet configuration and the logic on the judgment of data reception, even the data involving a bit error in transmission can be correctly transferred so far as the error occurs just once.

For the purpose of enabling the transmission of data to endure two or more bit errors, it evidently suffices to increase the number of repeating transmissions of overheads by the units of 2 and apply the principle of decision by majority to the $(2n+1)$ sets of data bits at the receiving station. That is, when at least $(n+1)$ of the $(2n+1)$ sets of data bits coincide, such a set of coinciding data bits is accepted as correct.

For the respective system parameters in the preferred embodiment of FIG. 3, for example, the values such as are shown below may be fixed.

Figure 4:
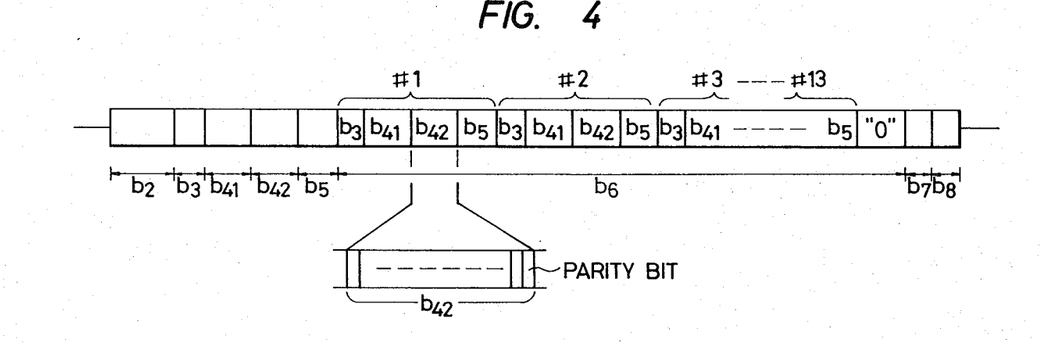
FIG. 4 is a diagram illustrating a packet configuration in the second preferred embodiment of this invention.

(1) Number of blocks per frame; N = 120 channels
(2) Length of data field; $b_6$ = 640 bits
(3) Length of guard time; $b_1 + b_9$ = 40 bits
(4) Length of overhead; 80 bits
(5) Length of guard time + length of overhead; g = 120 bits
(6) Contents of overhead:
   (A) Length of preamble; $b_2$ = 16 bits
   (B) Start flag; $b_3$ = 8 bits
   (C) Destination address; $b_{41}$ = 16 bits ⎫
   (D) Source address; $b_{42}$ = 16 bits ⎬ $b_4$ = 32 bits
   (E) Control bits; $b_5$ = 8 bits ⎭
   (F) Check bits; $b_7$ = 8 bits
   (G) End flag; $b_8$ = 8 bits
(7) Length of one block; B = $b_6$ + g = 760 bits
(8) Length of one frame; L = N × B = 91,200 bits
(9) Period of frame; $T_f$ = 10 mS FIG. 4 is a diagram illustrating a typical packet configuration for use in the second preferred embodiment of this invention. In this diagram, the same symbols as used in FIG. 3 denote the same fields or bits.

Comparison of the packet configuration illustrated in FIG. 4 with that illustrated in FIG. 3 clearly reveals that in the former packet, the overhead bits which comprise a start flag $b_3$, a destination address $b_{41}$, a source address $b_{42}$, and a control bit $b_5$, are repeatedly inserted in the data field $b_6$ to full capacity, with 0's inserted in the final fractional bits not admitted into the data field.

In terms of the aforementioned system parameters having specific numerical values, the packet configuration permits 13 repeated insertions of overhead bits, with 0's inserted in the remaining 16 bits.

Further, in the present preferred embodiment, it is noted from FIG. 4 which illustrates a part of the packet configuration (the portion of $b_{42}$) as enlarged that the last bits respectively of the destination address $b_{41}$, the source address $b_{42}$, and the control bit $b_5$ are allotted for the purpose of parity. In the present preferred embodiment, therefore, detection of error can be carried out separately in the fields of $b_{41}$, $b_{42}$, and $b_5$.

At the receiving station, therefore, parity check is executed separately in the aforementioned fields of $b_{41}$, $b_{42}$, and $b_5$ whenever a regular overhead is received. When the parity check detects no error, the station immediately takes in the data of the field. When the parity check detects an error, the station executes the parity check on the overhead data in the subsequent data field received successively thereafter.

After all necessary overhead bits have been taken in without any error, the system executes the establishment/termination of a call as required. In accordance with the present preferred embodiment, therefore, the establishment/termination of a call can be executed more rapidly and the efficiency of transmission of the system as a whole can be improved.

As is well known, the method of error detection by means of parity is simple to perform and yet is incapable of detecting an error in an even number of bits. By adopting a special measure in which the data in the field judged being free from the bit error by parity check are subjected to the logic of the decision by majority, the reliability of the system may be improved.

Another possible measure may comprise allocating a plurality of parity bits per field instead of allocating just one parity bit per field or combining several fields as a unity and allocating the last two of the control bits $b_5$, as the parity bits for the group consisting of the destination address $b_{41}$, the source address $b_{42}$, and the control bits $b_5$.

As is clear from the foregoing description, the present preferred embodiment permits the data of the overhead field to be repeatedly inserted in the data field of the packet transmitted in the phase of the establishment/termination of a call. Full utilization of this function at the receiving station, therefore, brings about the following effects.

(1) The erroneous operation or connection causable by the bit error during the packet transmission can be minimized.
(2) The time required for the establishment/termination of a call (connection control) can be minimized.
(3) In consequence of the effects of (1) and (2) above, the efficiency of transmission on the telecommunication cable can be improved and the probability of "busy" during the heavy traffic can be lowered.

Now, the operation in the phase of the data transmission in this invention will be described hereinafter.

When the receiving station has confirmed a certain packet to be one addressed to itself, since the system has an established rule that "the packet located at one and the same position (bearing the same block number) in the subsequent frame is naturally addressed to itself" as described above, this invention enables the receiving station to take in the packet located in the block bearing this block number even when the address bits transmitted in the subsequent phase of the transmission of data happen to contain a code error (namely, when data are erroneously addressed to some other personal station or the address code is disturbed by noise). By this function, the possible effect of the code error on the connection control can be minimized.

For this purpose, the present invention contemplates causing the count (=block number) on the frame counter 68 in the packet reception to be temporarily memorized in a memory device such as a flipflop, for example, during the phase of the establishment of a call and, after the phase of the transmission of data is started, enabling the receiving station to confirm a particular packet received in the block having in the frame counter the same count as that in the memory device to be one addressed to itself and take it in.

Figure 5:
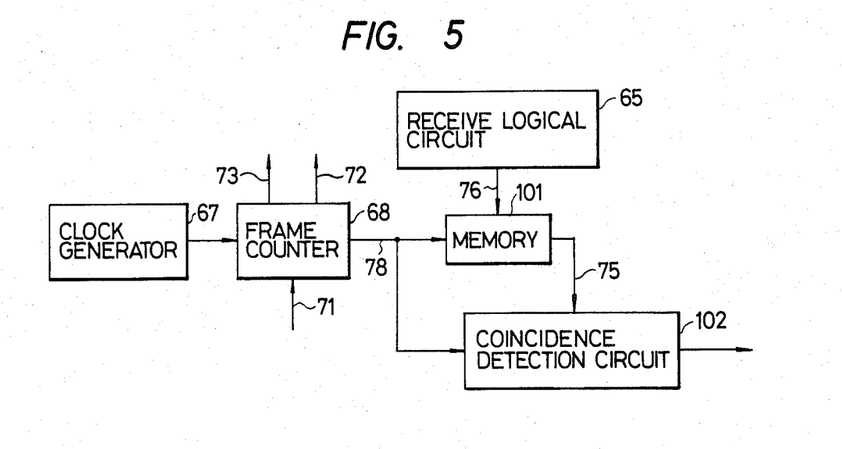
FIG. 5 is a block diagram illustrating a typical block counter configuration suitable for the third preferred embodiment of this invention.

FIG. 5 is a block diagram illustrating a concrete system to be used for effecting the operation described above. In this diagram, the same symbols as used in FIG. 2 denote identical or similar items. In FIG. 5, 68 denotes a frame counter circuit for producing block timing 72 and frame timing 73.

A block number 78 can be fed out on the basis of the count in the aforementioned frame counter 68. This is accomplished, for example, by adopting a measure capable of causing the counter which counts the output of a clock generator 67 to be reset for each count of one block's length. Consequently, the block number 78 is derived as the output of the counter 68.

In actuality, it is convenient to provide a logic circuit capable of detecting the status in which the parallel data from the group of shift registers for producing the frame timing 73 reach a preset value and take count of the output of the logic circuit.

By 76 is denoted an address confirmation signal to be supplied from a reception logical circuit 65. When the reception of a pocket addressed to the receiving station is confirmed during the phase of the establishment of a call by some suitable method as described above, this confirmation signal is of such nature as to cause conversion of "0" to "1," for example.

By 101 is denoted a memory device such as a flipflop, for example, which receives the block number 78 for temporary storage by the timing of the generation of the address confirmation signal 76. Denoted by 102 is a coincidence detection circuit using an exclusive "OR" circuit.

Operationally, after the frame counter 68 has been reset by the reset signal 71, the block number 78 is sequentially increased as the aforementioned counter 68 takes count of the clock from the clock generator 67. The aforementioned block number 78 is supplied to the memory 101 and the coincidence detection circuit 102.

When the address confirmation signal 76 is issued at the time that the packet of a certain block number is received by the receiving station, that particular block number is stored in the memory 101. This block number, namely the block number of the packet in which the signal addressed to the receiving station is transmitted, is supplied as a reference signal 75 to the coincidence detection circuit 102. Thus, the coincidence detection circuit 102 can feed out a coincidence signal ("1" for example) as its output when the subsequent frame is received and the frame counter 68 produces the same block number.

From the foregoing description, it may be clear that the use of this coincidence signal permits correct identification of the packet addressed to the receiving station even when the address bits of the packet transmitted after the start of the subsequent phase of the transmission of data happen to contain a code error.

In the digital signal transmission system of the operating principle illustrated in FIG. 1 and FIG. 2 and described previously, an unspecific master station takes the initiative of system timing and the remaining stations make a mutually synchronous relationship in concert with the system timing.

A certain station could be permanently appointed as a master station, depending on the nature of the system. For more general purposes, it is convenient to design the system so that, as described previously, an unspecific station which happens to be the first to send out a signal while none of the other stations is issuing any signal on the telecommunication cable 3 becomes a master station. At the moment that this particular station completes the pertinent communication, the function as a master station is transferred to some other station which happens to be engaging in communication at that precise moment.

The slave stations, therefore, are required to be capable of identifying a master packet from the master station, no matter whether that master packet is addressed or not addressed to themselves, and synchronizing the system timing based on the source address of the master station. The technical idea depicted in FIG. 5 can be applied to the present situation.

In the case of the digital signal transmission system illustrated in FIG. 1 and FIG. 2, for example, the stations sort the master packet with reference to the identifying data contained in the start flag $b_3$, or the control bits $b_5$, and supply the reset signal 71 to the frame counter 68 so that the block timing 72 and the frame timing 73 will be generated at the trailing edge of the block.

Also in this case, there is effected an operation to confirm the aforementioned identifying data and the transmitter address, as occasion demands, for the purpose of precluding possible occurrence of an erroneous operation due to a code error during the transmission.

The resetting operation by the reset signal 71 is desired to be effected for each of the frames being transmitted. If the received master packet happens to contain a code error, however, the identity of the master packet cannot be established and the resetting operation can not be effected for each of the frames. Thus, there may ensue the possibility of the timing being heavily lagged.

Figure 6:
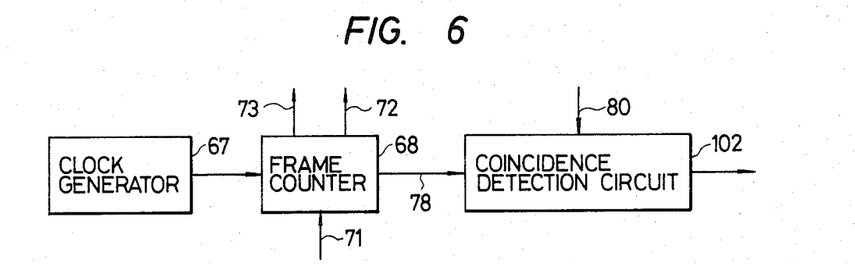
FIG. 6 is a block diagram illustrating a modified application of the block counter of FIG. 5.

Even in this case, however, the occurrence of the timing lag described above can be prevented by using a block counter circuit of FIG. 6, which is a modification of the circuit of FIG. 5.

In this case, a fixed block number (such as, for example, #1) immediately preceding the occurrence of the frame timing 73 is used as the reference signal 80 for the coincidence detection circuit 102 of FIG. 6. When the system is given this configuration, the coincidence detection circuit 102 feeds out its output at the time that the block number 78 which is the output of the frame counter 68 reaches the aforementioned reference number 80 as is readily understood from the description given above with reference to FIG. 5.

The issuance of this output permits decision of the timing of the reception of the master packet. Owing to this output, the desire to effect the resetting operation for each of the frames can be fully attained.

If an error occurs in the identifying data or address bits contained in the received packet, therefore, the synchronization of the system timing can be safely retained irrespectively of such an error.

Moreover the circuit of FIG. 6 can be utilized for the purpose of storing the numbers of empty blocks on the telecommunication cable 3 or designating a number of communication block to be used for delivery of the packet out of the empty blocks.

In the receive logical circuit 65, for example, the signal on the telecommunication cable 3 is subjected to carrier detection. When, in this case, the detected data are supplied as the reference signal 80 for "1" or "0", for example, to the coincidence detection circuit 102, the storage and registration of the empty block number can be easily executed on the basis of the output of the coincidence detection circuit 102.

As is easily noted from the description given above with reference to FIG. 1 and FIG. 2, the system of the present invention ceases to find any use for the overhead bits included in the received packet for the purpose of connection control at the time that the phase of the transmission of data (communication) is started after completion of the establishment of a call. Thus, it becomes possible for the system to increase the data bits $b_6$ (the so-called data field), in the reception packet proportionately and increase the quantity of the data to be transmitted and, in the meantime, keep the length of the packet intact.

Figure 7:
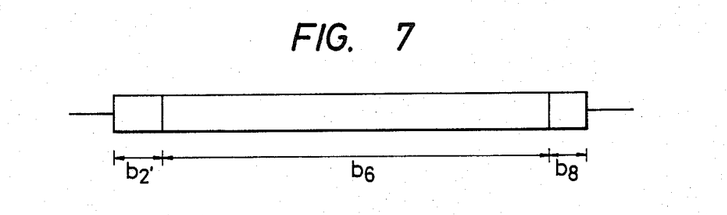
FIG. 7 is a diagram illustrating a typical packet configuration for use in the fourth preferred embodiment of the present invention.

FIG. 7 is a diagram illustrating a typical packet configuration for use in the preferred embodiment of this invention wherein the data field is expanded in the phase of the transmission of data (communication).

Comparison of the packet configuration of FIG. 7 with that of FIG. 1 clearly reveals that the former packet configuration lacks the field which consists of the start flag $b_3$, the address bits $b_4$, the control $b_5$, and the check bits $b_7$, and, instead, allocates all these bits as data bits $b_6$. This means that the number of data bits which can be transmitted in one packet is increased by the number of bits making up the lacking field. Of course, the overall packet length is invariable in the two packet configurations under comparison.

Further, in the former packet configuration, a modified preamble $b_2'$ is used in the place of the preamble $b_2$. The reason for the modification of preamble is as follows.

Once the phase of the transmission of data is started, the receiving station of course is capable of discerning the the modification of the preamble of FIG. 1 to that of FIG. 7. The other stations are not necessarily keeping watch on the transition of the phase of connection control or on the modification of packet configuration.

These other stations, therefore, are incapable of discerning whether the received packet has the ordinary configuration as illustrated in FIG. 1 or the modified configuration as illustrated in FIG. 7.

If they mistake the modified packet configuration of FIG. 7 for the ordinary packet configuration of FIG. 1, they are led to interpret the data (communication) actually sent out as data bits $b_6$, from the transmitting station, as the overhead such as the start flag $b_3$, and the address bits $b_4$ illustrated in FIG. 1, giving rise to an unexpected erroneous operation.

To avoid this trouble, therefore, the packet configuration of FIG. 7 has modified part of the pattern of the preamble $b_2$, so that all the receiving stations will be enabled to discern the distinction between the two packet configurations under comparison.

Owing to this modification, the station designated during the establishment of a call, on receiving the packet incorporating the modified preamble $b_2'$, becomes aware of the fact that the data field has been expanded and correctly takes in the data from the expanded data field, while the other stations not designated are caused to ignore these data.

In the embodiment illustrated in FIG. 7, the overhead bits are decreased to the utmost and the data field is expanded to the maximum. When a certain station, while transmitting data on the packet configuration of FIG. 7, for example, happens to have a turn at serving as a master station, since the packet configuration lacks the overhead data indispensable to the creation of system synchronization, there will ensue the problem that the other stations experience difficulty in keeping the system timing in a synchronized state.

For the solution of this problem, the data on position or the code for distance which is the minimum requirement for the synchronization of system is desired to be preserved next to the modified preamble $b_2'$ in the packet configuration of FIG. 7, for example.

As described above, the present preferred embodiment is so constructed that the block number of the received packet is fixed during the phase of the establishment of a call in the digital signal transmission system and, thereafter, the receiving station is enabled to take in the received packet by using this block number as a cue and, when necessary, additional data bits are allowed, during the phase of the transmission of data (communication), to be inserted in at least part of the overhead field normally used for admitting overhead bits.

The present preferred embodiment of the invention, therefore, can manifest the following effects.

(1) The receiving station cannot miss the packet even if a code error should occur during the transmission of signal.

(2) Even in the transmission of special signal such as digitized voice signal which has high redundancy and yet calls for real-time transmission, safe reception of the signal having no missing part is materialized.

(3) In the data transmission field, the overhead field can be decreased and the data bit field can be proportionately increased. Thus, the efficiency in data transmission can be accordingly improved.

What is claimed is:

1. A digital signal transmission system for effecting time-division multiplexing/circuit switching transmission of signals in the form of packets among a multiplicity of stations by causing digital signals transferred on a telecommunication cable to be fixedly positioned within periodically repeating frames along a time axis and further dividing each of the frames on said time axis into unit blocks thereby providing said stations with chances for digital signal transmission, each block being capable of containing a packet, and each packet containing an overhead field for containing connection control data and a data field, and operation of the system including phases involving establishment of a call, transmission of data, and termination of the call; which digital signal transmission system is characterized by a transmitting station inserting connection control data not only in the overhead field but also into the data field of the packet being transmitted during periods of connection control such as the phases of the establishment/termination of a call.

2. A digital signal transmission system according to claim 1, wherein said connection control data of the overhead field are inserted by the transmitting station a plurality of times into the data field during periods of connection control.

3. A digital signal transmission system according to claim 1 or claim 2, wherein at least one set of the connection control data of the overhead field inserted a plurality of times into the data field contains therein a parity bit.

4. A digital signal transmission system for effecting time-division multiplexing/circuit switching transmission of signals in the form of packets among a multiplicity of stations by causing digital signals transferred on a telecommunication cable to be fixedly positioned within periodically repeating frames along a time axis and further dividing each of the frames on said time axis into unit blocks thereby providing said stations with chances for digital signal transmission, each block being capable of containing a packet, and each packet containing an overhead field for containing connection control data and a data field; and the operation of the system including phases involving establishment of a call, transmission of data, and termination of the call; which digital signal transmission is characterized by a receiving station, during periods of connection control such as the phases of the establishment/termination of a call, reading out connection control data of the overhead field in a received packet and, at the same time, reading out the connection control data inserted a plurality of times within the data field, and thereby determining the connection control data by the principle of decision by majority.

5. A digital signal transmission system according to claim 4, wherein at least one set of the connection control data inserted into the data field contains therein a parity bit.

6. A digital signal transmission system for effecting time-division multiplexing-circuit switching transmission of signals in the form of packets among a multiplicity of stations by causing digital signals transferred on a telecommunication cable to be fixedly positioned within periodically repeating frames along a time axis and further dividing each of the frames on said time axis into unit blocks thereby providing said stations with chances for digital signal transmission, each block being capable of containing a packet, and the operation of the system including phases involving establishment of a call, transmission of data, and termination of the call; which digital signal transmission system is characterized by a receiving station, during the phase of the establishment of a call, confirming and memorizing positional data (such as, for example, a block number) of a block addressed to itself on the basis of overhead data in a received packet and, after completion of said establishment of a call, during each frame taking in the packet in each data out of block identified on the basis of said positional data.

7. A digital signal transmission system according to claim 6, wherein said receiving station, after having confirmed and memorized the block number of the block addressed to itself, takes in the data of the packet even when the overhead data received in that packet happens to contain a code error.

8. A digital signal transmission system for effecting time-division multiplexing/circuit switching transmission of signals in the form of packets among a multiplicity of stations by causing digital signals transferred on a telecommunication cable to be fixedly positioned within periodically repeating frames along a time axis and further dividing each of the frames on said time axis into unit blocks thereby providing said stations with chances for digital signal transmission, each block being capable of containing a packet, and each packet containing an overhead field and a data field, and the operation of the system including phases involving establishment of a call, transmission of data, and termination of the call; which digital signal transmission system is characterized by a transmitting station inserting additional data bits into at least part of the overhead field in the packet being transmitted during the phase of the transmission of data thereby increasing the amount of data being transmitted per packet during the phase of the transmission of data.

9. A digital signal transmission system for effecting time-division multiplexing/circuit switching transmission of signals in the form of packets among a multiplicity of stations by causing digital signals transferred on a telecommunication cable to be fixedly positioned within periodically repeating frames along a time axis and further dividing each of the frames on said time axis into unit blocks thereby providing said stations with chances for digital signal transmission, each block being capable of containing a packet, and each packet containing an overhead field and a data field, and the operation of the system including phases involving establishment of a call, transmission of data, and termination of the call; which digital signal transmission system is characterized by each receiving station establishing synchronization of system timing on a basis of the data in a received master packet and, at the same time, memorizing a block number of said master packet within a frame and, thereafter, executing operation of system timing synchronization on the basis of the data of a packet received at said block number even when the overhead data received in that packet happen to contain a code error.

* * * * *